United States Patent [19]
Yanakieva et al.

[11] 3,924,096
[45] Dec. 2, 1975

[54] DEVICE FOR AUTOMATICALLY MAINTAINING A ROTARY ELECTRODE COMPOSED OF SINGLE WIRES OF A PREDETERMINED DIAMETER

[75] Inventors: Nadejda Stefanova Yanakieva; Dragomirov Papazov, both of Sofia, Bulgaria

[73] Assignee: DSO "E L P R O M", Sofia, Bulgaria

[22] Filed: Mar. 25, 1974

[21] Appl. No.: 454,662

[30] Foreign Application Priority Data

Mar. 23, 1973 Burma .................. 23073

[52] U.S. Cl. .................. 219/130; 219/61
[51] Int. Cl.[2] .................. B23K 9/04
[58] Field of Search .................. 219/61, 130

[56] References Cited

UNITED STATES PATENTS

| | | | |
|---|---|---|---|
| 2,837,626 | 6/1958 | Buck et al. | 219/61 |
| 2,868,956 | 1/1959 | Lobosco | 219/130 X |
| 3,272,961 | 9/1966 | Maier et al. | 219/61 X |
| 3,562,577 | 2/1971 | Kensrue | 219/130 X |
| 3,621,185 | 11/1971 | Iceland et al. | 219/130 |
| 3,652,823 | 3/1972 | Clemens et al. | 219/130 |

*Primary Examiner*—J. V. Truhe
*Assistant Examiner*—N. D. Herkamp

[57] ABSTRACT

A device for automatically maintaining the diameter of a rotating electrode composed of a plurality of single wires substantially constant. It can be applied in electrodes for electric spark deposition, as well as in other productions where instruments of this type are used. The composite rotating electrode is composed of single wires which are fed radially from an electrode head through individual small channels. As a result of continuous operation, the wires are consumed and the outside diameter of the composite electrode is reduced. In order to operate again normally, the electrode composed of single wires must provide for moving these wires forward, outside the head. The device of the invention automatically maintains the predetermined diameter of the electrode without stopping its operation, until a whole reserve of wires carried by the electrode head is exhausted. The device has a photosensor actuating an electric motor, whose hollow shaft drives a number of worm wheels, coupled with friction rolls, which unwind the wires from corresponding drums and feed them to the workpiece.

6 Claims, 4 Drawing Figures

DEVICE FOR AUTOMATICALLY MAINTAINING A ROTARY ELECTRODE COMPOSED OF SINGLE WIRES OF A PREDETERMINED DIAMETER

This invention relates to a device for automatically maintaining a rotating electrode composed of a plurality of single wires of a predetermined diameter. It can be applied in electrodes for electric spark depositing, as well as in other productions where instruments of this type are used.

In electric spark equipment rotating electrodes composed of a plurality of single wires are used, such wires being fed radially through individual small channels in the electrode head. As a result of continuous operation, the wires are worn or consumed and the diameter of the rotating composite electrode is reduced. In order again to operate normally, the electrode must provide for moving these individual wires forward to a zone outside the head.

A device is known in which small reserves of bundles or coils of the wires forming the electrode are mounted in the back part of the head carrying the electrode. The pushing of the coil or bundle is carried out manually by turning a screw, and can be done only after stopping the operation of the electrode. A further disadvantage of the known device is the possibility of entanglement of the wire bundles during their being pushed. Another disadvantage is the fact that the wire reserve cannot have a length greater than several centimeters.

It is therefore a general object of the present invention to avoid the described disadvantages by providing a device for automatically maintaining the electrode of a predetermined diameter without stopping its operation until the whole reserve of wires is exhausted.

This object is attained by the use of a photosensor actuating an electric brake or motor having a hollow shaft which drives a number of worm wheels coupled with friction rolls which unwind the wires from corresponding drums and feed them to the workpiece.

For a better understanding of the invention, reference should be made to the accompanying drawings in which there is illustrated and described a preferred embodiment of the invention. In the drawings.

Figure 1:
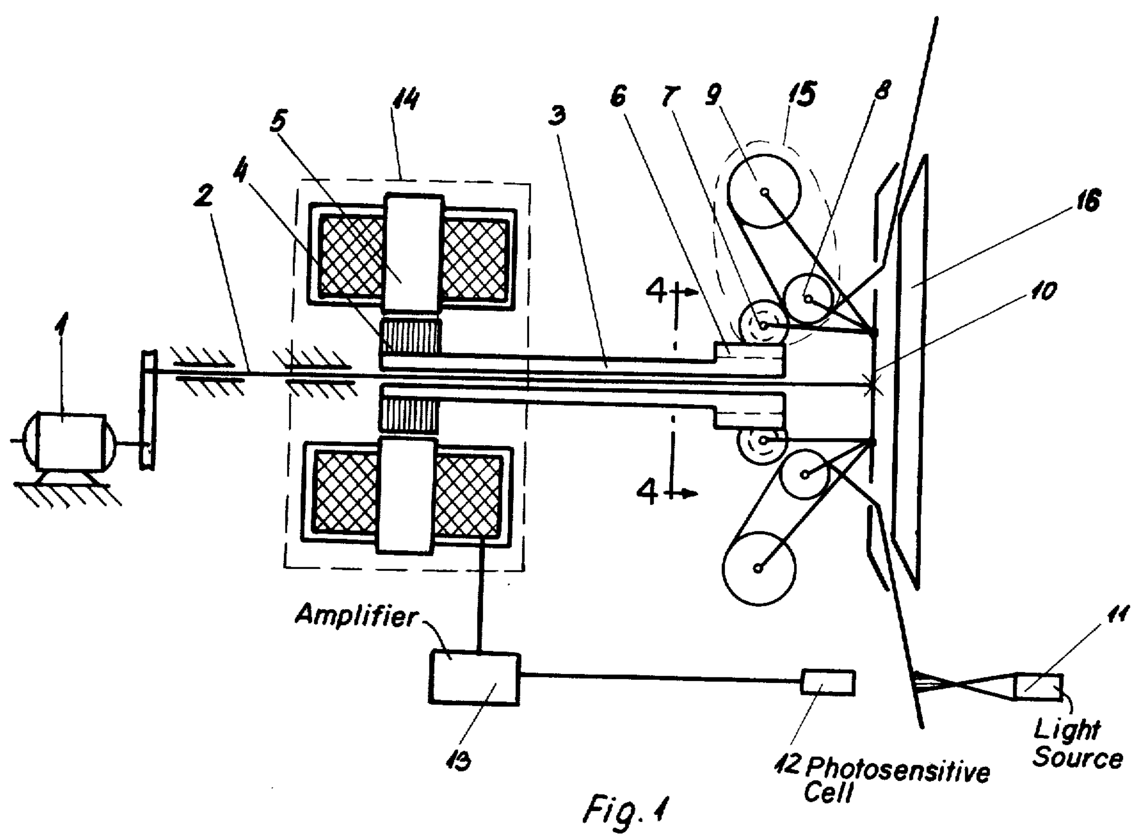
FIG. 1 is a diagrammatic illustration partially in elevation and partially in axial section through a device according to the invention.
Figure 2:
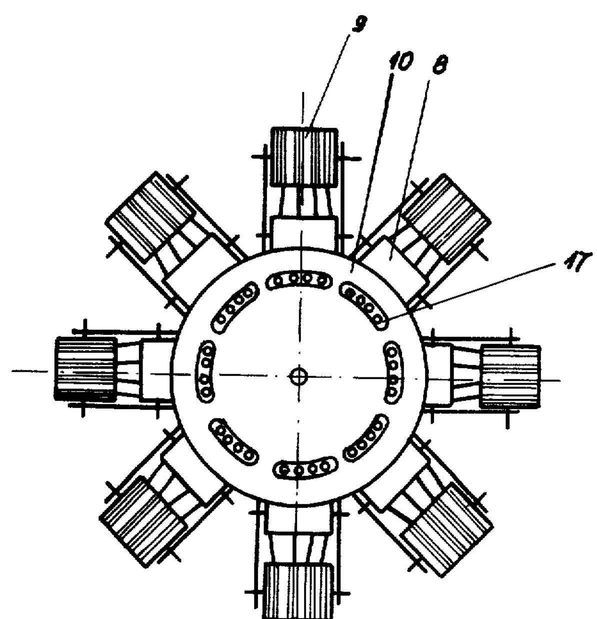
FIG. 2 is a front view of the device with the cover of the electrode removed.
Figure 3:
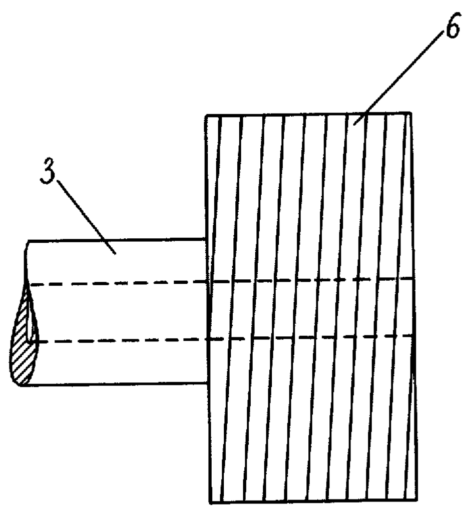
FIG. 3 is a fragmentary view in side elevation of the worm which drives the wire feeding systems.
Figure 4:
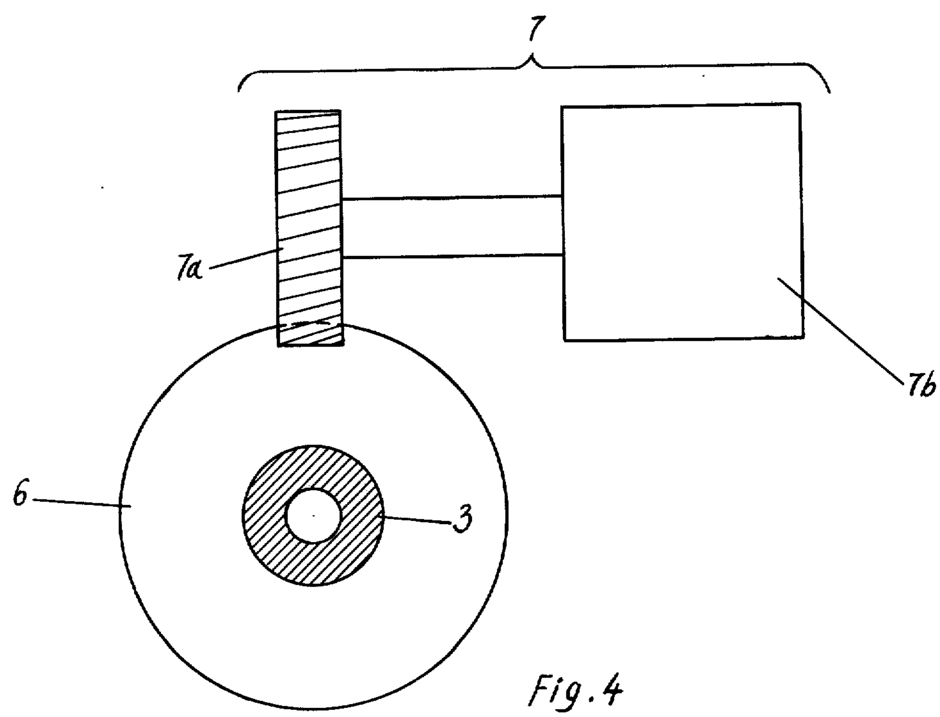
FIG. 4 is a schematic view in end elevation taken from the point of view of line 4—4 in FIG. 1.

In the illustrative embodiment the composite electrode is shown as being made up of eight groups of individual wires disposed at equal angles about the head of the electrode (FIG. 2), there being four individual wires in each group. It is to be understood that the number of wires in the groups, and the number of groups can be varied widely. An electric motor 1 transmit through a schematically shown transmission such as sprockets and a chain or pulleys and a belt a rotational motion at a predetermined speed to a shaft 2. Rigidly fastened to the right hand end of the shaft 2 as it is shown in FIG. 1 is a holder 10 of an electrode head, the holder 10 rotating at a speed of the shaft 2. Mounted upon the holder 10 are a plurality of identical electrode wire supplying systems 15 which are distributed at equal angles about the holder 10 as shown in FIG. 2. Each of the systems 15 has a drum 9, a combined roll 7, and a roll 8. Wound upon the drum 9 in the embodiment shown are four wires W disposed side by side, the wires W being uncoiled from the drum 9 in parallel, side by side relationship as shown in FIG. 2. Such four wires of each system pass between the respective rolls 7 and 8, pressed one against the other, and then they pass through a corresponding arcuately shaped opening 17 in holder 10, each of the individual wires then being separated from its neighbors and passed through an individual guiding channel, mounted upon the holder 10, such individual guiding channels not being shown. Mounted upon the holder 10 by central supporting means (not shown) secured thereto is a cover 16, the holder 10 and the cover 16 presenting spaced therebetween at their outer edges through which the individual wires of the composite electrode emerge.

The composite electrode is of frusto-conical shape, having a broad apex angle, the individual wires of the thus formed composite electrode being substantially uniformly angularly spaced from each other.

The combined roll 7 is a cylindrical body, there being a worm wheel *7a* fixedly secured to the shaft bearing roll 7 at one end thereof, the other cylindrical part *7b* of the combined roll 7 being coated with an elastic or resilient material such as rubber or a rubber-like material. The roll 8, which is also coated with an elastic or resilient material such as rubber or the like, rotates freely about its axis and is constantly urged toward the roll 7 by means such as springs or the like (not shown).

The shaft 2 is received within a sleeve 3 disposed coaxially thereof, sleeve 3 extending from the rear of the electrode head to a location intermediate the length of the shaft 2. At its forward end the sleeve 3 has affixed thereto a worm or endless screw 6 with which the worm wheels of all the combined rolls 7 are continuously in mesh. At its rear end the sleeve 3 has affixed thereto the rotor or armature 4 of an electrical device 14 having a wound stator 5 cooperating with the armature or rotor 4.

During operation of the electrode head the shaft 2 and the holder 10 are operated by the motor 4, engagement between the worm wheels on the combined rolls 7 and the worm 6 on the sleeve 3 causing the sleeve and the armature 4 to rotate in the same direction and at the same speed as the shaft 2. Thus under such conditions the combined rolls do not rotate about their axis and the individual wires making up the composite electrode are not fed outwardly from their supply drums 9.

Located on one side of the wires making up the composite electrode is a photosensitive cell 12 which is connected to an amplifier 13 which in turn is connected to the winding 5 or the stator of the device 14. A light source 11 having a suitable system of projecting lenses projects a light beam through the curtain of the rotating composite electrode formed by the individual wires therein toward the photosensitive cell 12. The system is so constructed and arranged that so long as the quantity of light received by the photoelectric cell 12 at any given moment does not rise above a certain value the stator 5 of the device 14 remains deenergized. When, as a result of prolonged operation of the composite electrode, the wires thereof are shortened and the outer diameter of the electrode decreases beyond a certain desired value, light from the light source 11 falls freely upon the photosensitive cell 12, the signal from the cell 12 is amplified in the device 13 and operates a relay (not shown) whereby the stator 5 of the device 14 is energized from an external source of current (not shown). The device 14 functions as a brake, when the stator 5 is thus energized, the armature or rotor 4 then ceases to rotate and thus the sleeve 3 and the worm 6 rotate with respect to the shaft 2 and thus with respect to the worm wheels of the combined rolls 7. The screw 6 then turns the worm wheels of the combined roll 7 around their own axes so as to feed the individual wires forwardly from the supply drums 9. Such action takes place simultaneously with all of the systems 15, since the worms of all the combined rolls 7 are engaged with the worm 6. At the time that the systems 15 are being operated to feed the individual wires of the electrode outwardly, the electrode as a whole continuous to rotate and operate.

When the individual wires forming the composite electrode are fed outwardly sufficiently for the diameter of the electrode to become equal to or greater than the desired predetermined value, the photosensitive cell 12 receives a diminished quantity of light from the light source 11 because of the interposition of the rotating individual wires between the light source and the cell. The stator 5 or the device 14 is then deenergized, and the sleeve 3 once more rotates in the same direction and at the same speed as the shaft 2.

Although the above description of the operation of the device, the element 14 has been described as functioning as a brake which, whenever energized, stops the armature 4 and the shaft 3 from rotation, it is to be understood that device 14 may be an electric motor which when energized causes the sleeve 3 and the worm 6 affixed thereto to rotate at a speed which is different from that of shaft 2 and or in a direction which is different from that of shaft 2, thereby producing a relative motion between the worm wheels affixed to the combined rolls 7 and the screw 6 so as to feed electrode wires forwardly from the supply drums 9 of each of the systems 15.

The worm 6 and the worm gears 7 are so constructed and arranged that the drive therethrough is irreversible; that is, rotation of the sleeve 3 relative to the shaft 2 and holder 10 drives worm gears 7 and the ones of the pinch roll pairs to which the respective worm gears 7 are secured, but the sleeve 3 and 6 can not be driven by rotation of worm gears 7 about their axes. It is because of such relationship that when the stator 5 of mechanism 14 is not energized rotation of shaft 2 and holder 10 rotates sleeve 3 at the same speed and in the same direction as shaft 2.

Although the invention is illustrated and described with reference to a plurality of preferred embodiments thereof, it is to be expressly understood that it is in no way limited to the disclosure of such a plurality of preferred embodiments, but is capable of numerous modifications within the scope of the appended claims.

What is claimed is:

1. In a mechanism for creating and maintaining a composite rotating electrode, said electrode being formed of a plurality of single wires which emerge from a rotating depositing head mounted upon a driven shaft, the improvement which comprises a holder mounted upon said shaft coaxial thereof adjacent the depositing head of the electrode, a plurality of systems each carrying a supply of individual electrode wires on the holder, each system including means for feeding the wires thereof outwardly mounted upon the holder in equally angularly spaced relationship about the common axis of the shaft and the holder, each of said systems comprising a drum means adapted to carry a coil of electrode forming wire thereon, a pair of pinch rolls for selectively feeding such wire from the drum, a sleeve mounted telescopically about the shaft coaxial thereof, said sleeve having a worm on the end thereof adjacent the electrode head, a worm affixed to one of the pinch rolls of each of said systems and constantly in mesh with said worm, the worm end and worm gears being so constructed and arranged that the worm gear can be driven by the worm but the worm cannot be driven by the worm gear, whereby the sleeve normally rotates in the same direction and at the same speed as the shaft and the holder, and means for selectively changing the speed of rotation of the sleeve with respect to the shaft so that the pinch rolls feed individual wires outwardly of the electrode head.

2. A mechanism according to claim 1, wherein the means for changing the speed of rotation of the sleeve relative to the shaft comprises an electromagnetic mechanism having a rotor affixed to the sleeve, a stator with a winding, and means for varying the energization of the stator.

3. A mechanism according to claim 2 for maintaining the rotating electrode of a given diameter, wherein the means for varying the energization of the stator comprises means directing a beam of light through the curtain of rotating individual wires making up the composite electrode externally of the electrode head, a photosensitive cell located in a position to receive light from said light source after the beam has passed through the curtain, and circuit means controlled by the photoelectric cell for supplying the stator with energizing current when the intensity of beam the of light received by the photosensitive cell exceeds a predetermined value.

4. A device according to claim 3, wherein said circuit means comprises an amplifier connected to the photosensitive cell, and a relay operated by the amplifier interposed between a source of electric current and a stator of the electromagnetic device, whereby when the intensity of the beam of light received by the photosensitive cell exceeds a predetermined value the amplifier operates the relay which in turn connects the stator of the electromagnetic device to said source of current.

5. A mechanism according to claim 1, wherein the holder is in the form of a disk which is attached transversely to the shaft, the holder having a plurality of uniformly angularly spaced slots therein corresponding in number and spacing to the number and spacing of the systems on the holder, such slots receiving the wires which are fed therethrough from the corresponding systems.

6. Mechanism according to claim 1, wherein the drum of each system contains coils of a plurality of electrode wires disposed side byside by side and comprising means on the holder for guiding each wire individually from the drum.

* * * * *